(No Model.)
J. H. DRAKE.
FILTER.
No. 468,294. Patented Feb. 2, 1892.
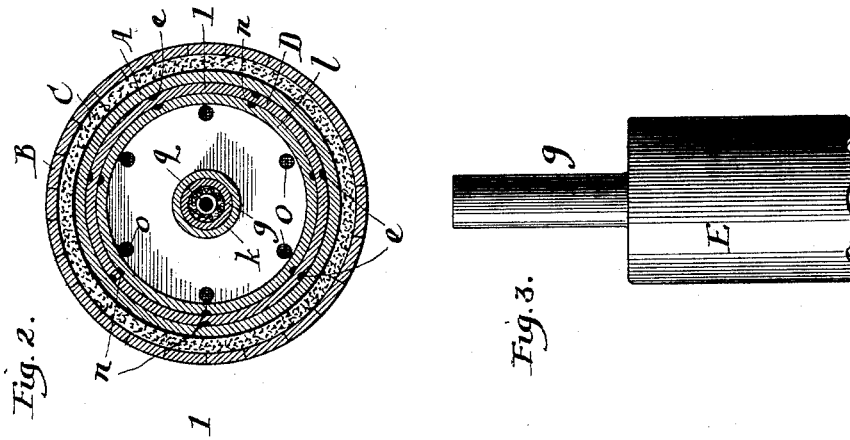
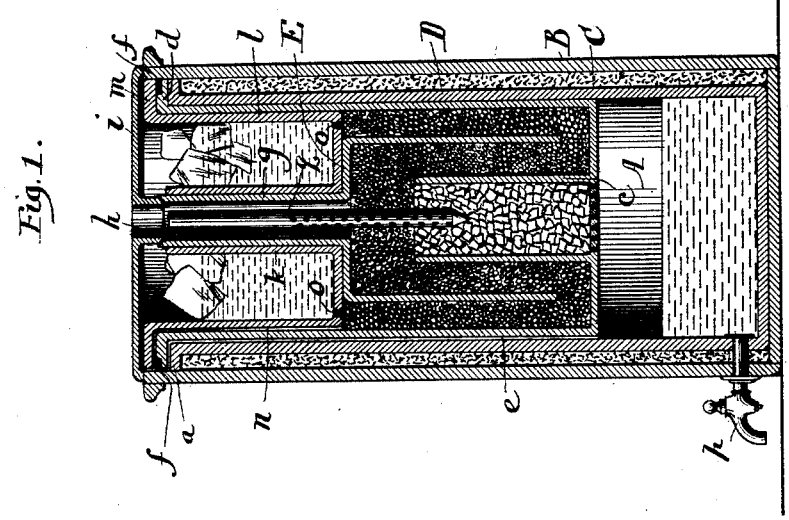
Witnesses:
Fred Gerlach
L.B. Carpenter
Inventor:
James H. Drake
By Price & Fisher
Attorneys.

UNITED STATES PATENT OFFICE.

JAMES H. DRAKE, OF ST. PAUL, MINNESOTA, ASSIGNOR TO HOWARD B. DRAKE.

FILTER.

SPECIFICATION forming part of Letters Patent No. 468,294, dated February 2, 1892.

Application filed May 6, 1891. Serial No. 391,707. (No model.)

*To all whom it may concern:*

Be it known that I, JAMES H. DRAKE, residing at St. Paul, in the county of Ramsey, State of Minnesota, have invented certain new and useful Improvements in Water-Filters, of which the following is hereby declared to be a full, clear, and exact description, sufficient to enable others skilled in the art to which such invention appertains to make and use the same.

The invention relates to water-filters, and especially to such wherein the water is aerated in process of filtration to render it more potable.

The improvement designs to provide a filter of simple and effective structure which will allow the water-supply to circulate through the filtering medium evenly and quietly, its grosser impurities being first withdrawn or separated, so as not to clog or contaminate the body of the filtering material, and while in circulation to be charged with fresh air in volume sufficient to remove the flat insipid taste which so often characterizes ordinary filtered water. Provision is made for cooling or chilling the water, and it is also designed to expose the filtering medium proper to a changing volume of air which will oxidize the fungus, must, or like organic growths that so often develop in the damp medium, especially after temporary disuse. A free circulation of air and water through the filtering material is established which renders the water crisp, fresh, and sparkling, while the body of the material is kept sweet and comparatively unclogged for a long time, thus dispensing with the need of any frequent replenishing. The peculiarities in structure distinctive of the invention will appear from the description following, and be thereafter pointed out by claim at the conclusion thereof.

Figure 1 is a longitudinal central section of the improved filter on line 1 1 of Fig. 2. Fig. 2 is a cross-sectional view of the same on line 2 2 of Fig. 1. Fig. 3 is a detail view of the filter-jar.

Various parts of the filter which are exposed to the action of the water may be made of any suitable material—such as pottery-ware, zinc, enamelled iron, pressed paper-pulp, (varnished,) or the like. The main reservoir A is conveniently made in cylindrical form and is provided with an outer casing B, of wood or the like, to protect the same, the intervening space C being filled with some suitable non conducting material—such as wood-charcoal, &c.—as usual. Suspended within the main reservoir A is the filter-vessel D, furnished, preferably, with an overhang lip or rim $d$, which rests upon the ledge $a$ of the main reservoir, and is suspended thereby in place. Extending upward from its bottom the filter-vessel is furnished with an internal cup $c$, ordinarily made in piece therewith and serving to separate and sustain a portion of the filtering material or medium above the perforated part of the filtering-vessel D. A series of air ducts or channels $e$ are formed at various intervals on the external face or wall of the filter-vessel, so that when such vessel is in position the ducts afford ways for free egress or circulation of air through the same from the well of the main reservoir A upward between the adjacent walls of said reservoir and the filter-vessel. The ducts $e$ are continued in the overhang rim $d$ of the vessel and discharge thence into the circular ledge-channel $f$, formed in the overhang rim. Within the filter-vessel D, and surrounding the cup $c$ thereof about mid-distance between such cup and the vessel-wall, is the filter-jar E, of bottle-like contour, and generally sustained at its open bottom upon the base of the filter-vessel. The jar E is furnished with a protruding neck $g$, which extends upwardly therefrom to meet the nipple or inlet $h$, projecting inwardly from the lid or cover $i$ of the reservoir and casing.

About the neck $g$ of the filter-jar fits the dish $l$, a tubular portion $k$ (or simple opening with packing therein) serving to prevent leakage from the dish. Said dish has an overhang ledge $m$, which rests upon the ledge $d$ of the filter-vessel D and rests snugly upon the shoulder of the jar E. Along the external face of the dish $l$ are a series of air-ducts $n$, which open at the bottom from the interior of the filter-vessel D and discharge at the top along the edge of the overhang lip $m$ of the dish. The bottom of the dish $l$ is perforated at various points $o$ sufficient to allow for the gradual escape of the water contained in the dish into the filtering medium located beneath. The holes o are filled with asbestos, sponge, flannel, fine wire-gauze, &c., to obstruct the passage of sand, clay, or like heavy particles which may be in suspension in the water to be filtered. By such arrangement these heavier impurities are excluded entirely from the filtering material, so that it will remain uncontaminated thereby, and is less liable to clog rapidly, while the upper dish is easily accessible and can be cleaned frequentlly by the unskilled without disturbing the position of the main body of the filtering material. The air-ducts n e establish communication from the well of the reservoir and the interior of the filter-vessel, respectively, with the upper dish l, so that any warm air or deleterious gases which may develop can find vent through such passages and pass upwardly into the dish l, where they are chilled and absorbed by the water contained therein. At the same time a free air-supply passes into the interior of the filter-vessel through the inlet h and neck g of the filter-jar, whereby the body of the filtering material is kept constantly freshened and oxidized, thus eliminating any tendency to the growth of organic fungus and maintaining the filtering medium in a sweet and clean condition. The upper dish l receives the water and ice supply, and distributes the water in suitable volume through the outlet o into the filter proper. The water passes circuitously through the body of the filter, around the base of the jar E, and thence over the top of the cup c, through the coarser filtering material therein, into the well or receptacle at the main reservoir A. A tap-cock p allows the water to be withdrawn, as desired. In flowing through the filter the water is delivered by the vent o of the dish l in position to avoid the formation of channels or runways, so that its progress through the filtering material is even and gradual, thus subjecting it to something of a "soaking" operation. In clearing the top of the cup c the flowing water is exposed to the action of a fresh body of air delivered thereto through the passages h g, and is thereby aerated and freshened to render it sparkling and potable. The filtering material within the cup c, being coarser in grain, allows for the rapid discharge of the accumulated water, so that an easy inflow of the necessary air is constantly induced. In order to better distribute the air to the water as it clears the top edge of the cup c, it is sometimes advisable to provide a perforated pipe, as at q, extending within the body of the filtering material and opening at its top into the neck of the filter-jar g. In such relation the pipe allows the air to be effectively introduced to the water at various low points, which might not be reached so well in the absence of the pipe.

Having thus described my invention, what I claim as new, and desire to secure by Letters Patent, is—

1. The combination, with the main reservoir, of the suspended filter-vessel having a central cup, a filter-jar surrounding said cup and having a protruding neck, and a cover having inlet therein snugly jointed to said jar-neck, whereby the external air for the filter-charge is excluded from the ice-chamber in its passage through the jar-neck, substantially as described.

2. The combination, with the outer casing and with the main reservoir, of the suspended filter-vessel having a central cup and ventilating-channels between the walls of said reservoir and vessel, respectively, the filter-jar located within the filter-vessel and around the cup thereof and having a protruding neck, an upper dish provided with a central tube to receive the jar-neck and with ventilating-channels between the walls of said dish and filter-vessel, respectively, and the casing-cover having an inlet communicating with said jar-neck and spaced near the rim thereof to connect with the dish-channels, substantially as described.

3. The combination, with the main reservoir, of the filter-vessel suspended therein and having a central cup, an overhang rim, and external air-ducts, the filter-jar located within the filter-vessel and around the cup thereof and having a protruding neck, an upper dish provided with a central opening to receive the jar-neck, an overhang rim, and air-ducts at the external wall thereof, and the reservoir-cover having an inlet communicating with said jar-neck and spaced near the rim thereof to connect with the dish-channels, substantially as described.

JAMES H. DRAKE.

Witnesses:
SMETHAM LEE,
O. D. WHEELER.